Nov. 25, 1952 W. HATTON 2,619,551

TELEPHONE STATION RINGING EQUIPMENT

Filed Jan. 23, 1951 2 SHEETS—SHEET 1

INVENTOR
WILLIAM HATTON
BY [signature]
AGENT

INVENTOR
WILLIAM HATTON
BY
AGENT

Patented Nov. 25, 1952 2,619,551

UNITED STATES PATENT OFFICE 2,619,551

TELEPHONE STATION RINGING EQUIPMENT

William Hatton, South Orange, N. J., assignor to Federal Telephone and Radio Corporation, New York, N. Y., a corporation of Delaware Application January 23, 1951, Serial No. 207,288

7 Claims. (Cl. 179—84)

This invention relates to telephone station ringing systems and to ringer instruments therefor.

In telephone exchange systems it is necessary at a subscriber's station to differentiate between the station circuit condition when the handset is at rest on its cradle or hook, and the station circuit condition when the handset is lifted to signal the exchange that the station line is in a calling condition. The last-mentioned condition is usually effected by the closure of a direct current loop at the station across the conductors of the station line extending to the exchange, this direct current loop being open, however, when the handset is on its cradle or hook.

In order to permit a telephone station to be rung from the exchange when the handset is on its cradle or hook and the direct current loop is open, it is customary in this condition to connect the ringer in series with a condenser across the station conductors extending to the exchange and to provide at the exchange a source of alternating ringing current for operating the station ringer. This has necessitated the use at the station of a ringer polarized by the presence of a permanent magnet which imparts to the cores and armature a normal magnetic polarity so that the effect of alternating ringing current in the coils is to alter the magnetism in the cores and armature so that as the current reverses the free ends of the cores alternately attract and repel the two ends of the centrally-pivoted armature.

It is an object of the invention to dispense with the expensive permanent polarizing magnets in the station ringer and to provide a ringing circuit comprising a ringer without any permanent magnet polarizing means which will effectively and efficiently respond to alternating ringing current.

According to one feature of my invention I provide a telephone station ringing system for alternating ringing current comprising a ringer without any permanent magnet polarizing means, rectifying means for rectifying the alternating ringing current and means for applying the rectified current to the energizing coil of the ringer.

According to a further feature of my invention, I provide a telephone station ringing system for alternating ringing current comprising a ringer having a pair of energizing coils but without any permanent magnet polarizing means and unidirectional current conducting means so connected as to permit the passage of the positive half-cycles of the ringing current through one coil and the negative half-cycles through the other coil.

Referring to the accompanying drawings.

Figures 1, 2, 3:
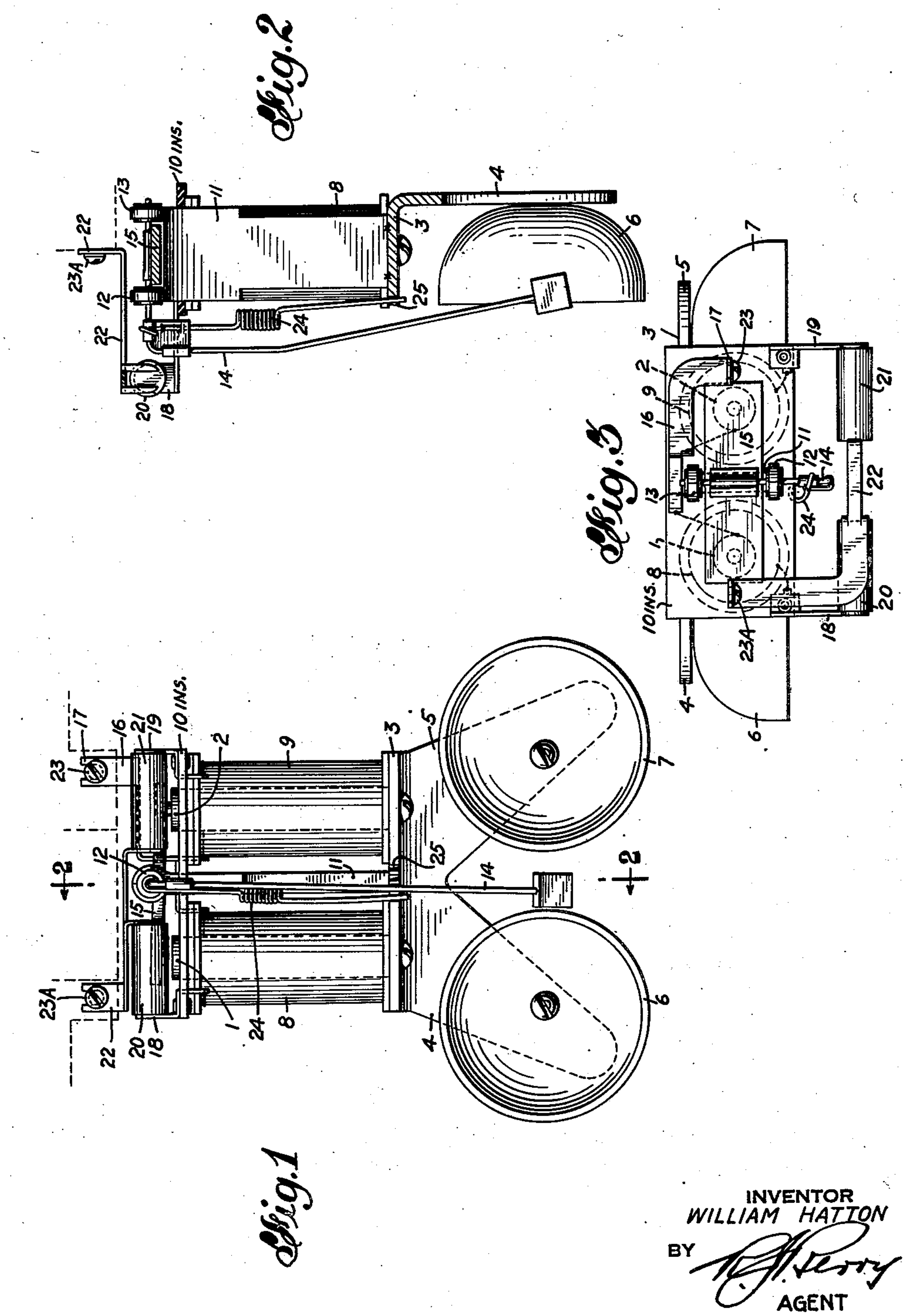
Fig. 1 is an elevational view of a ringer according to my invention.
Fig. 2 is a section taken on the line 2—2 of Fig. 1.
Fig. 3 is a plan view of the ringer of Fig. 1.

Referring first to Figs. 1 to 3, the ringer comprises a pair of cores 1, 2, mounted upon a yoke piece 3, which is preferably of soft iron and is formed with two projecting ears 4 and 5 on which are screwed the gongs 6 and 7. Energizing coils 8, 9 are respectively mounted on the cores 1 and 2. 10 is a strip of fibre or other insulating material which is threaded over and securely fixed on the free ends of the cores 1 and 2. Mounted upon the yoke piece 3 and extending between the cores 1, 2 is a bar 11 of magnetic material such as cold rolled steel formed at its free end with two bushings 12, 13 which act as bearings for a clapper rod 14. The clapper rod is bent at a right angle and terminates at its free end in a clapper located between the gongs 6, 7. An armature 15 is welded or otherwise secured at its centre to the portion of the clapper rod 14 between the bushings 12 and 13 so that this portion of the rod acts as a pivot for the armature 15 the ends of which are adjacent the free ends of the cores 1 and 2.

One end of each of the coils 8 and 9 is soldered to a connecting strip 16 mounted in the insulating strip 10 and having a forked end 17 which engages one input terminal 23 of the ringer. The other ends of the coils 8 and 9 are soldered to connecting tags 18 and 19 mounted on the insulating strip 10. Oppositely-poled unidirectional current conducting devices, such as selenium or copper oxide rectifiers 20 and 21, are respectively mounted between the connecting tags 18 and 19 and a connecting strip 22 the forked end of which engages the other input terminal 23A of the ringer.

The rectifiers 20 and 21 may be of the small cartridge type and if desired may be self-supported in wiring extending from the ends of the coils 8 and 9 to the input terminals 23 and 23A.

24 is a known form of biassing spring attached at one end to the clapped rod 14 and the free end of which is adapted to be located in notches 25 formed in the edge of the yoke piece 3 so as to bias the armature and to cause the ringer to respond only to negative or positive half-cycles of the alternating ringing current.

Figure 4:
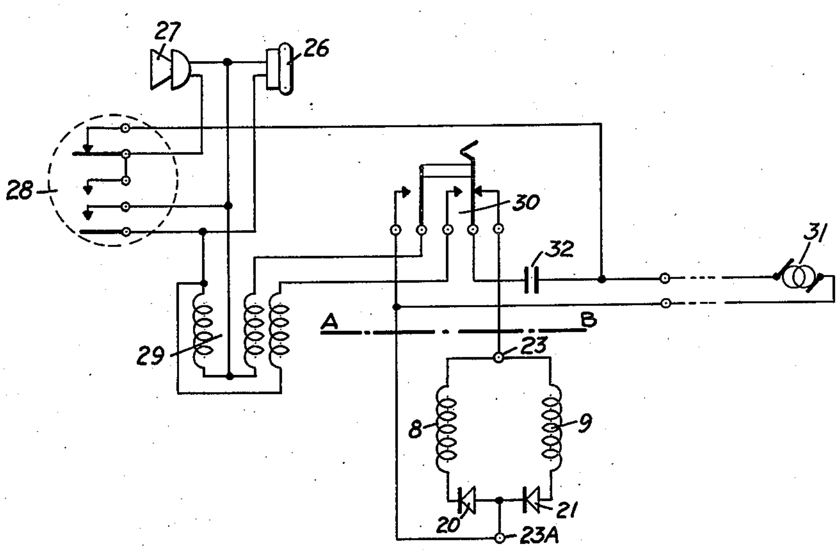
Fig. 4 is a circuit diagram of a telephone station showing the connection of the ringer according to my invention.

With the exception of the circuit of the ringer the station circuit shown in Fig. 4 is conventional and comprises the usual receiver 26, transmitter 27, impulse dial 28, induction coil 29 and switch-hook springs 30. It is assumed, of course, that the source 31 of alternating ringing current is at the central exchange. It will be noted that with the handset on the cradle and with the switch-hook springs 30 in the position shown the ringer coils 8 and 9 are parallel-connected in series with the condenser 32, and that the oppositely-poled rectifiers 20 and 21 are respectively inserted in series with the ringer coils 8 and 9. In operation, therefore, the coils 8 and 9 are alternately energized by the positive and negative half-cycles of alternating ringing current and the free ends of the armature 15 (Figs. 1 to 3) are alternately attached by the ends of the cores 1 and 2 and the clapper caused to strike the gongs 6 and 7.

Figure 5:
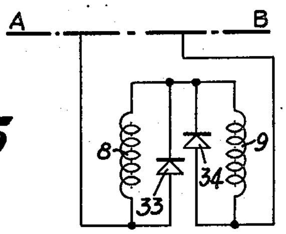
Fig. 5 is a modification of a portion of the circuit of Fig. 4.

Fig. 5 shows an alternative circuit arrangement in which the oppositely-poled rectifiers 33 and 34 are connected in shunt with the ringer coils 8 and 9 so that each rectifier acts as a substantial short-circuit for its respective coil 8 or 9 for alternate half-cycles of alternating current.

My invention is not to be regarded as restricted to the precise embodiments described above in detail and other modifications coming within the scope of the appended claims will readily occur to those versed in the art.

What is claimed is:

1. A telephone station ringing system comprising a telephone station, a ringer at said station having a pair of energizing coils but without any permanent magnet polarizing means, a source of alternating ringing current, and unidirectional current conducting means at said station so connected as to permit the passage of the positive half-cycles of said alternating ringing current through one said coil and the negative half-cycles of said alternating current through said other coil.

2. A telephone station ringing system for alternating ringing current comprising a telephone station, two station line conductors, a ringer at said station having a pair of energizing coils but without any permanent magnet polarizing means, means for connecting one said conductor to one end of each of said coils and means for connecting the respective other ends of said coils to said other conductor over oppositely-poled unidirectional current conducting devices.

3. A telephone station ringing system for alternating ringing current comprising a telephone station, two station line conductors, a ringer at said station having a pair of series-connected energizing coils but without any permanent polarizing means, means for connecting said station line conductors to the respective free ends of said coils, and a pair of oppositely-poled unidirectional current conducting devices connected one across each said coil.

4. A telephone station ringer for alternating ringing current comprising a pair of cores joined at one end by a yoke piece, a pair of energizing windings respectively surrounding each of said cores, a centrally pivoted armature the ends of which are respectively positioned adjacent the free ends of said cores, a gong, a clapper for said gong mounted on said armature, a pair of connecting terminals, a connection from one end of each of said coils to one of said connecting terminals, connections from the respective other ends of said coils to the other of said connecting terminals, and oppositely-poled unidirectional current conducting devices respectively inserted in said last-mentioned connections.

5. A telephone station ringer according to claim 4 further comprising a bar of magnetic material mounted at one end on said yoke piece and extending between said cores, and a pivot for said armature on the free end of said bar.

6. A telephone station ringer for alternating ringing current comprising a pair of cores joined at one end by a yoke piece, a pair of series-connected energizing windings respectively surrounding said cores, a centrally-pivoted armature the ends of which are respectively positioned adjacent the free ends of said cores, a gong, a clapper for said gong mounted on said armature, a pair of connecting terminals, connections from each of said connecting terminals to one of the free ends of said coils, and a pair of oppositely-poled unidirectional current conducting devices shunted one across each said coil.

7. A telephone station ringer for alternating ringing according to claim 7 further comprising a bar of magnetic material mounted at one end on said yoke piece and extending between said cores and a pivot for said armature on the free end of said bar.

WILLIAM HATTON.

REFERENCES CITED

The following references are of record in the file of this patent:

UNITED STATES PATENTS

| Number | Name | Date |
|---|---|---|
| 2,357,743 | Kenerson | Sept. 5, 1944 |
| 2,389,082 | Rhoads | Nov. 13, 1945 |
| 2,459,510 | Ellmann | Jan. 18, 1949 |